United States Patent [19]

Inokuchi

[11] Patent Number: 4,679,902

[45] Date of Patent: Jul. 14, 1987

[54] IMAGE FORMING OPTICAL APPARATUS

[75] Inventor: Toshiyuki Inokuchi, Yokohama, Japan

[73] Assignee: Ricoh Company, Ltd., Tokyo, Japan

[21] Appl. No.: 764,794

[22] Filed: Aug. 12, 1985

Related U.S. Application Data

[63] Continuation of Ser. No. 525,723, Aug. 23, 1983, abandoned.

[30] Foreign Application Priority Data

Aug. 23, 1982 [JP]  Japan .................. 57-145978

[51] Int. Cl.⁴ ............... G02B 27/00; G03B 27/52; G03B 27/70
[52] U.S. Cl. ...................... 350/167; 355/43
[58] Field of Search ............... 350/167, 446; 355/43, 355/49, 54

[56] References Cited

U.S. PATENT DOCUMENTS 3,183,767   5/1965   Brownscombe .............. 355/49
3,584,952   6/1971   Gundlach et al. .............. 350/167

Primary Examiner—John K. Corbin
Assistant Examiner—D. Edmondson
Attorney, Agent, or Firm—Oblon, Fisher, Spivak, McClelland & Maier

[57] ABSTRACT

This invention relates to an image forming optical apparatus in which a number of micro-lenses are arranged, and images formed by said lenses are superposed to obtain a synthesized image. In the optical apparatus of this kind, individual images have their respective irradiance distribution, and therefore, unevenness in the irradiance distribution of the synthesized image has to be minimized. Where this optical system is used for a copier or the like, exposure is carried out through a slit. The width and position of the slit greatly influence the irradiance for exposure and on unevenness in irradiance. According to the invention, optimum width and position of the slit can be selected to minimize the unevenness in irradiance and provide sufficient exposure.

3 Claims, 11 Drawing Figures

IMAGE FORMING OPTICAL APPARATUS

This is a continuation of application Ser. No. 525,723, filed Aug. 23, 1983 now abandoned.

BACKGROUND OF THE INVENTION

1. Field of the Invention

This invention relates to an image forming optical apparatus in which face scanning is effected by slit exposure in a copier or the like, and particularly, to an image forming optical apparatus which uses an array of Dachmirror lenses.

2. Description of the Prior Art

An array of Dachmirror lenses has been known, which comprises a combination of a row composed of a plurality of lenses 10 and a corrugated reflecting surface 11 provided behind said row, as shown in FIG. 1. This can be used, for example, in a copying machine in which light from a light source 20 is reflected at an original surface 21, and said light is deflected towards a Dachmirror lens system 23 by a reflecting means 22 to form a latent image on a photosensitive drum 24, as shown in FIG. 2.

At this time, exposure is carried out through a slit 25. The width of the slit 25 and the position of slit relative to the Dachmirror lens system are important elements which control irradiance and an unevenness in irradiance at the time of exposure. However, sufficient studies have not yet been made on this respect.

SUMMARY OF THE INVENTION

This invention has been accomplished under the actual circumstances as described above, and it is an object of the present invention to provide an image forming optical apparatus which involves no unevenness in irradiance and which can supply a sufficient irradiance.

To achieve the above-described object, in accordance with this invention there is provided an optical imaging system for projecting light images from an object surface toward an image surface, said imaging system including a plurality of optical devices comprising a roof mirror lens array, said roof mirror lens array comprising a lens array and a roof mirror array which are fabricated by precise plastic molding and are integrally elongated, said roof mirror lens array being disposed between the object surface and the image surface, wherein an irradiance distribution at the imaging surface of said roof mirror lens array is given by:

$$L_T(y) = C \sum_{i=1}^{N} \left[ \int_{x1}^{x2} V_i(\{y - (i-1)p\}^2 + x^2])x \frac{z^4}{[\{y - (i-1)p\}^2 + x^2 + z^2]^2} \, dx \right]$$

where

- $L_T(y)$: irradiance distribution at the imaging surface of the roof mirror lens array
- $V_i(\ )$: aperture efficiency at the position on the imaging surface
- p: array pitch of the i'th single lens system
- x: position perpendicular to the array in the image surface
- y: position parallel to the array in the image surface;
- i: the i'th lens of the roof mirror lens array; — and the irradiance unevenness for scanning $\Delta L_T$ is determined by:

$$\Delta L_T = \frac{L_T \max - L_T \min}{L_T \max}$$

where $L_T$ max and $L_T$ min, respectively, indicate the maximum and minimum of the irradiance distribution $L_T(y)$, a slit being provided having the slit position $(x_1, x_2)$ and slit width $\overline{x_1 x_2}$ so that said $L_T(y)$ is made to be maximum and said $\Delta L_T$ is made to be minimum.

DETAILED DESCRIPTION OF THE PREFERRED EMBODIMENT

Figure 3:
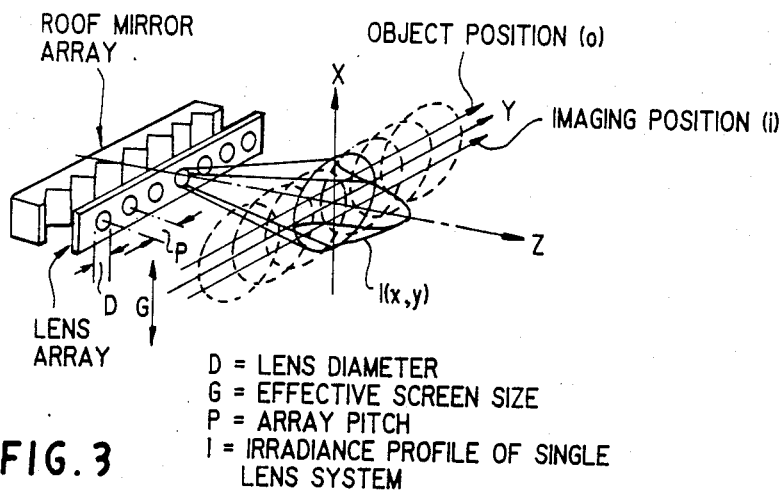
FIG. 3 is a perspective view showing the irradiance distribution by lenses of the Dachmirror lens system.

In the Dachmirror lens system, a number of lenses are arranged with a pitch p on the axis Y as shown in FIG. 3. There will now be considered the distribution of quantities of light by the i'th lens in the scanning line Q (a, y) of x=a on the screen shown in FIG. 4. Here, the term "i'th lens" is meant by the i'th one counted from one end of a number of lenses juxtaposed on the axis Y of the Dachmirror lens system.

The principle of this invention will be discussed before the specific embodiment is described.

Figure 5:
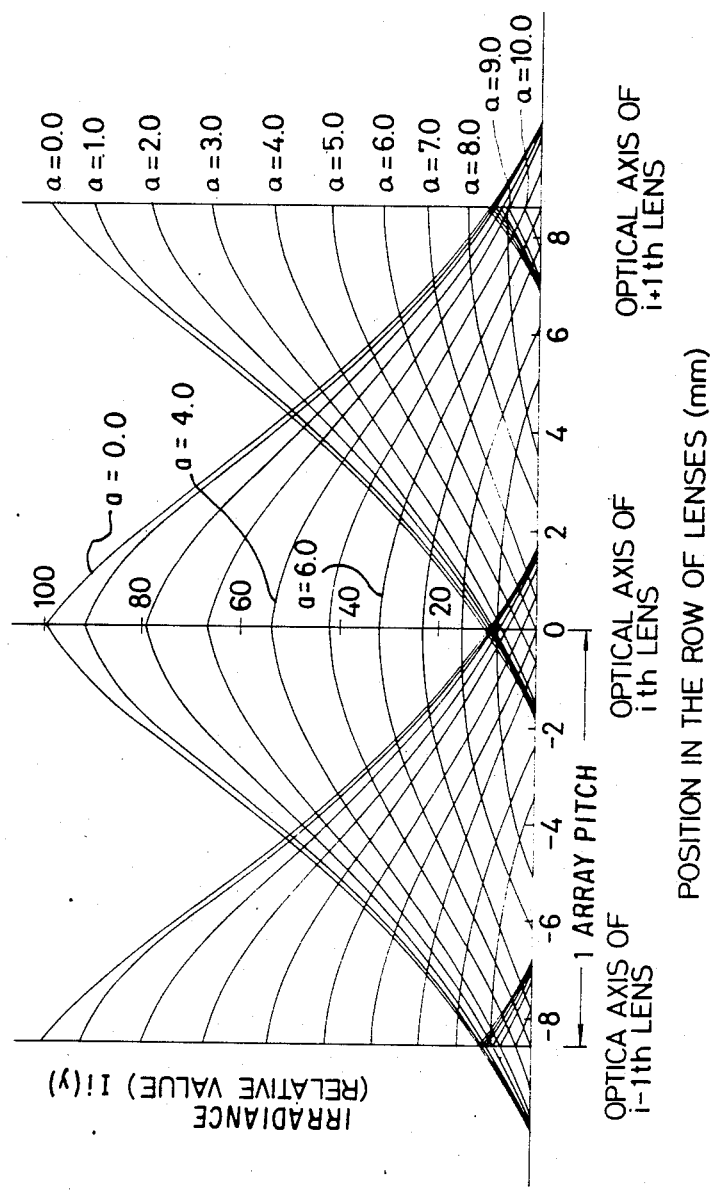
FIG. 5 is a view showing the change in irradiance distribution of a single Dachmirror lens with respect to a height of each slit.

The irradiance distribution $I_i(y)$ in the specific scanning line Q (a, y) in connection with the i'th lens among Dachmirror lenses is given by $$I_i(y) = c V_i(y) \cos^4 \theta_i(y) \tag{1}$$

where $V_i(y)$ represents the aperture efficiency at the scanning line Q (a, y), $\theta_i(y)$ the semi-angle of view of the i'th lens with respect to the scanning line Q (a, y) and c the standardized constant. The above-described formula (1) is a known formula showing the irradiance distribution of focusing by a general lens, and the term $\cos^4 \theta$ indicates the lowering of the irradiance by the semi-angle of view $\theta$. This is as shown in FIG. 5 in connection with each slit height a.

The synthesized irradiance distribution $I_T(y)$ is obtained by summing up the irradiance distribution $T_i(y)$ about i from 1 to N and is given by:

$$I_T(y) = \sum_{i=1}^{N} I_i(y) \tag{2}$$

Figure 6:
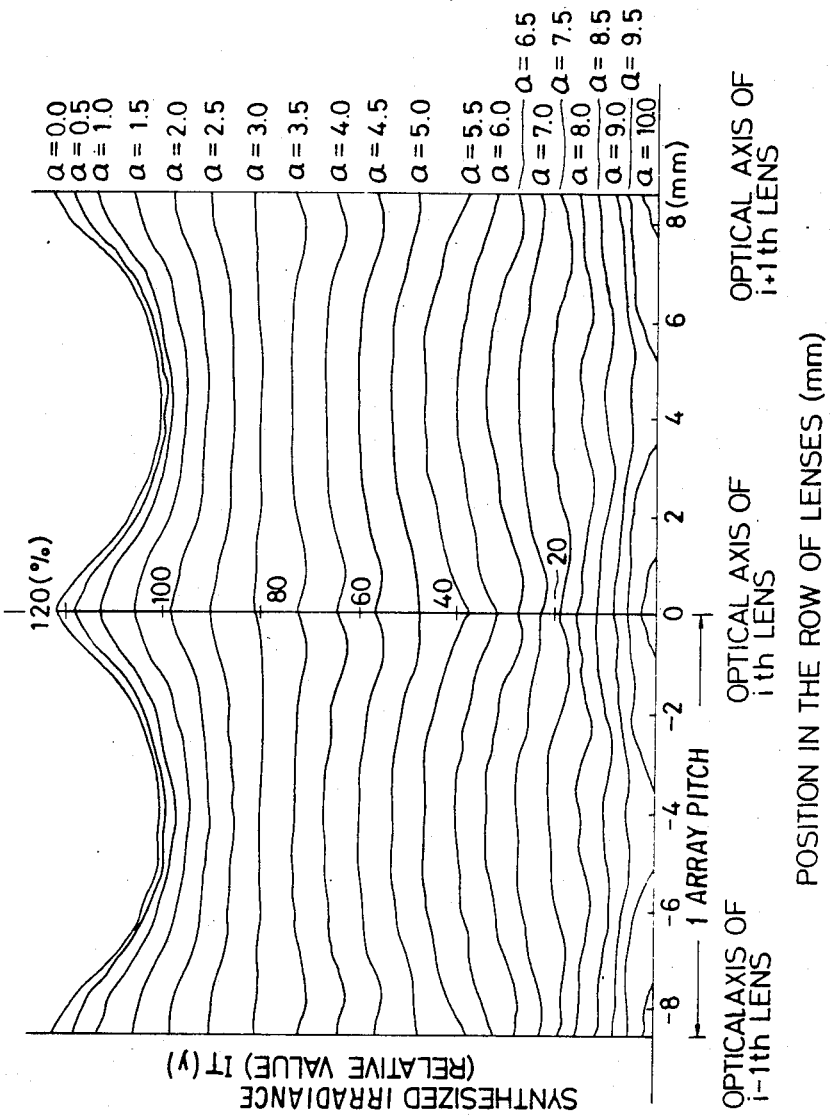
FIG. 6 is a view showing the synthesized irradiance distribution for the case of FIG. 5.

This is as shown in FIG. 6.

As can be seen clearly from FIG. 6, the synthesized irradiance decreases as the slit height a increases, and the unevenness in irradiance is minimum in the vicinity of $a \approx 3.0$ mm.

For a slit height greater or smaller than 3.0 mm, a periodical phase reversion of the change in the irradiance distribution takes place in accordance with the pitch of the lens array. It is therefore found that if this phase reversion phenomenon is utilized, there is a possibility capable of removing the unevenness in irradiance within the specific slit width.

This will be discussed hereinafter.

Figure 4:
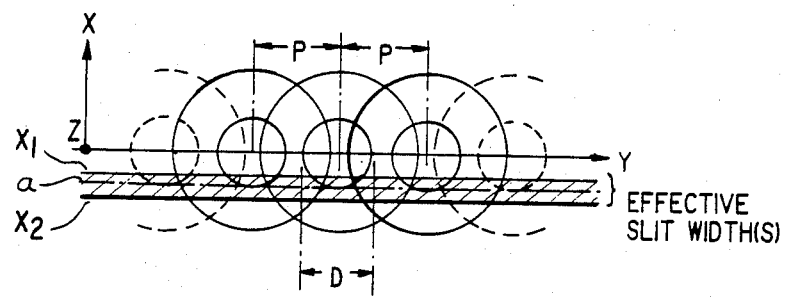
FIG. 4 is a view showing the relationship between the overlapping of the irradiance distribution by lenses on the screen placed on the image plane (which is also the object plane) at the front of the Dachmirror lens system.

The specific scanning line has been discussed, and the irradiance distribution $L_T(y)$ in connection with the face scanning is obtained by integrating the irradiance distribution $I_T(y)$ within a particular slit width $x_1 - x_2$ and is given by:

$$L_T(y) = \int_{x_1}^{x_2} I_T(y) \cdot dx \tag{3}$$

$$= \int_{x_1}^{x_2} \sum_{i=1}^{N} I_i(y) \cdot dx$$

$$= c \sum_{i=1}^{N} \left[ \int_{x_1}^{x_2} V_i([\{y - (i-1)p\}^2 + x^2]^{\frac{1}{2}}) \times \frac{z^4}{[\{y - (i-1)p\}^2 + x^2 + z^2]^2} \cdot dx \right]$$

where p represents the array pitch of lens, y the position in a direction of the row of lenses, x the position in a vertical direction to the row of lenses, and z the object distance of the lens (FIGS. 3, 4).

The unevenness in irradiance $\Delta L_T$ is given by $$\Delta L_T = \frac{L_{Tmax} - L_{Tmin}}{L_{Tmax}} \times 100 \, (\%) \tag{4}$$

where $L_{Tmax}$ and $L_{Tmin}$ represent the maximum value and minimum value, respectively, of $L_T(y)$.

Figure 1:
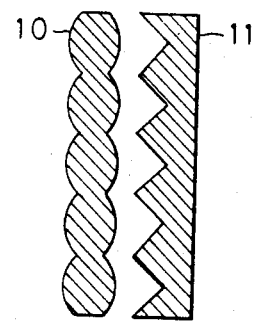
FIG. 1 is a cross sectional view showing a Dachmirror lens system of the prior art.
Figure 2:
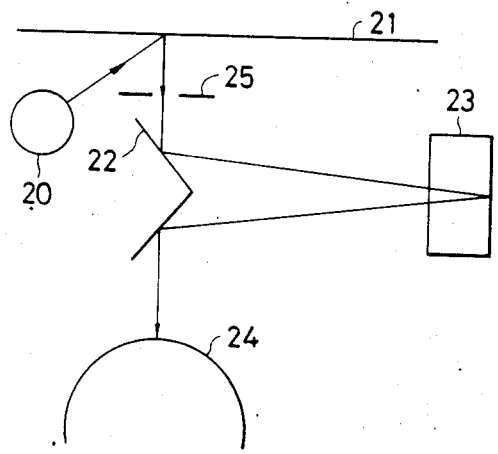
FIG. 2 is a schematic view of an image forming optical apparatus using the Dachmirror lens system of the prior art.
Figure 7:
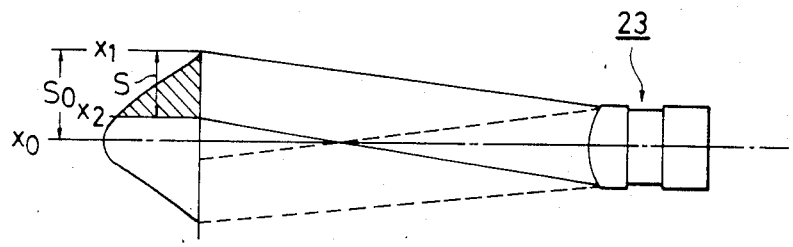
FIGS. 7 and 9 are respectively explanatory views of the principle of this invention.

(1) Since in the apparatus as shown in FIG. 2, light flux in the vicinity of an optical axis cannot be used, the relation of the slit width s, irradiance and unevenness in irradiance will be examined where one end of the slit is an effective frame end. For this purpose, in a Dachmirror lens system 23 as shown in FIG. 7, the variation of irradiance and unevenness in irradiance with respect to the slit width s is obtained where $x_2$ is varied from $x_1$ to $x_o$.

Figure 8:
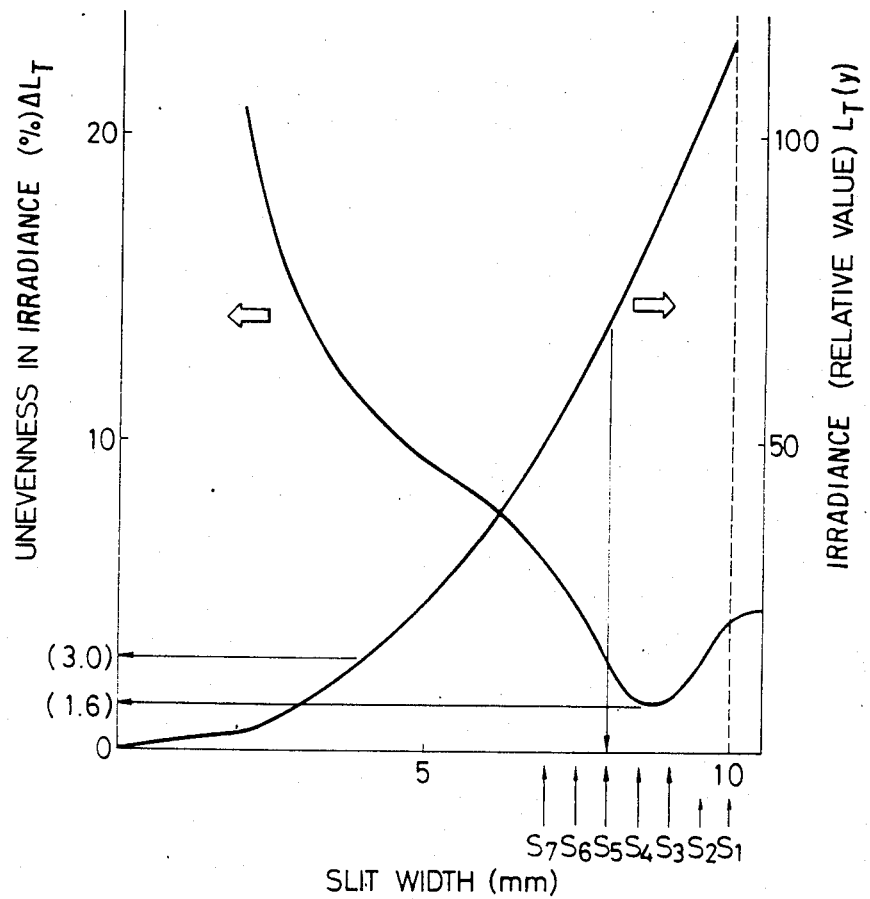
FIGS. 8 and 10 are respectively views showing the relation of the slit width, irradiance and unevenness in irradiance obtained in accordance with the principle of FIGS. 7 and 9.

The result is as shown in FIG. 8. As can be seen from the same figure, where the whole frame on one side of the optical axis is made to be an effective slit, that is, $x_2$ is zero (which corresponds to $s_1$ in the figure), the unevenness in irradiance is 4.2%, and where the other end of the slit is 2.0–2.5 mm from the optical axis ($x_2 = 2.0 - 2.5$ mm), the unevenness in irradiance is minimum. In this case, the slit width is 7.8 to 8.0 mm ($S_4 \sim S_3$ in the figure).

Accordingly, in terms of the irradiance, it is preferable that the whole frame is made to be the effective slit, but the light path structure of the in-mirror type is restricted by the slit width. In the existing apparatus as shown in FIG. 2, a region of slit height less than 2 mm cannot be used. Therefore, actually, the arrangement as described below is necessary.

Figure 9:
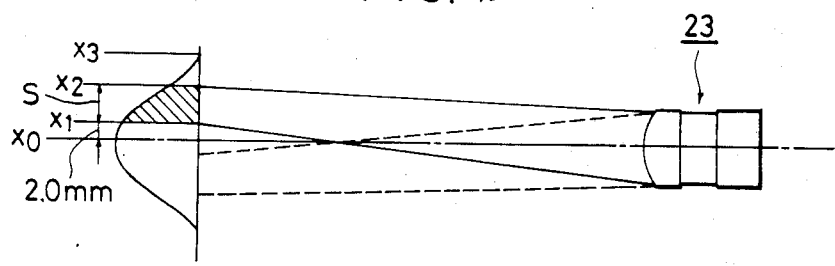

(2) Where one end $x_1$ of the slit is fixed at a height 2 mm (FIG. 9):

That is, the variation of the irradiance and unevenness in irradiance with respect to the slit width s is obtained, in which case, $x_2$ is varied from $x_1$ to $x_3$ in FIG. 9.

Figure 10:
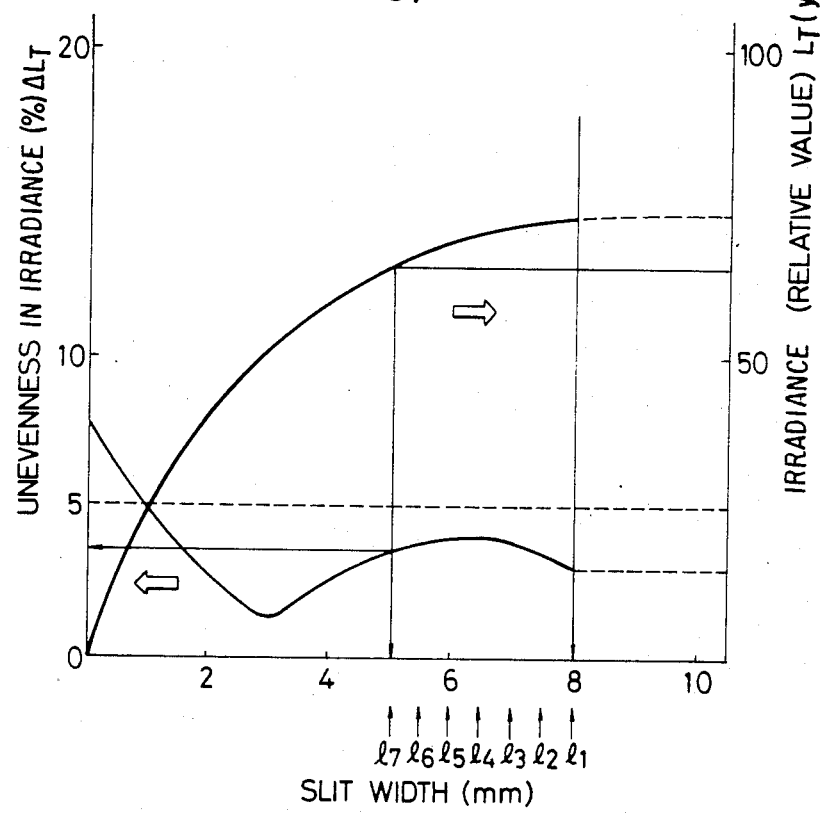

The result is as shown in FIG. 10. It is found from the same figure that if the slit width s is more than 1 mm, the unevenness in irradiance with respect to a suitable slit width s up to the effective limit slit width is within 5%. Actually, if the unevenness in irradiance is less than 5%, no practical problem occurs in processing of images. Thus, the slit can be formed with a target of this 5%.

Figure 11:
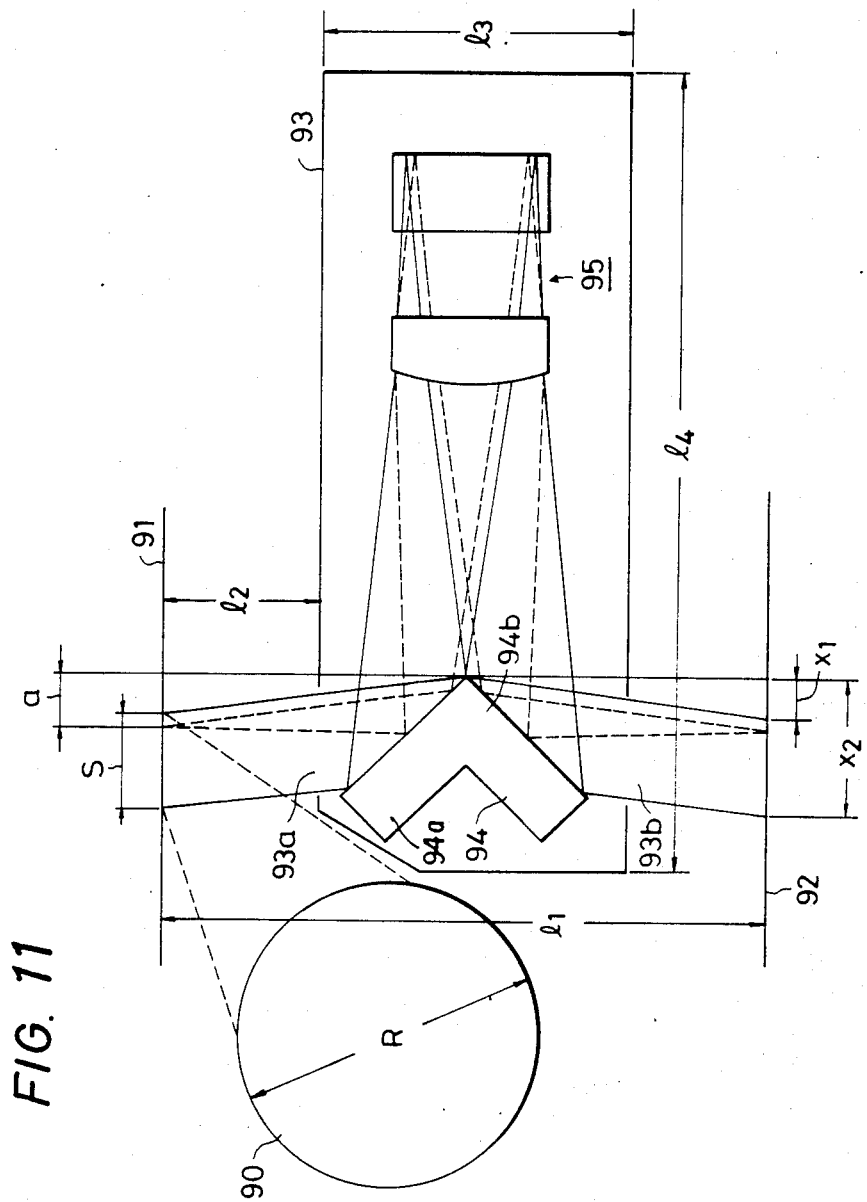
FIG. 11 is a structural view of an embodiment in accordance with the present invention.

(3) In view of the above-described consideration, according to the present invention, the image forming apparatus can be constructed in a manner as shown in FIG. 11, for example.

That is, where an original surface 91 illuminated by a light source 90 in the form of a fluorescent lamp having a diameter R of 15 mm and an object image of the original surface 91 is formed on an exposure surface 92 distanced by $l_1 = 31.0$ mm from the original surface, the image forming apparatus can be constructed as follows.

In view of the discussion in connection with para. 2 in consideration of the aforementioned formulae (3) and (4), if for example, values are set so as to provide the effective slit width $s = 5$ mm, $x_1 = 2.0$ mm and $x_2 = 7.0$ mm, the optimal condition shown in FIG. 10 is fulfilled.

To this end, within a housing 93, which upper surface is positioned $l_2 = 7.5$ mm from the undersurface of the original surface, having a height $l_3 = 16.0$ mm and a length $l_4 = 38.3$ mm are provided a micro-Dachmirror lens system 95 and a reflecting means 94 having a first reflecting surface 94a for deflecting the image of the object of the original surface 91 in a direction toward the lens system 95 and a second reflecting surface 94b for further deflecting the reflected light from the lens system 95 in a direction different from said object.

Since the values of parameters of the micro-Dachmirror lens system 95 are primarily determined, the width of slit apertures 93a and 93b of the housing 93 and the position of the reflecting means 94 with respect to the Dachmirror lens system 95 or the angle of the reflecting surfaces 94a and 94b are adjusted so that s, $x_1$ and $x_2$ shown may assume a predetermined value. A reference character a in the figure denotes a position of a scanning line, and here $a = 2.8$ mm is set.

In the above-described explanation, the parameters represent the quantities as follows:

$l_1$ is the distance from the object to the image,
$l_2$ is the distance from the object to the upper surface of the housing,
$l_3$ is the height of the housing (distance between the upper surface and lower surface),
$l_4$ is the length of the housing, $x_1$ is the distance from the optical axis to the other end of the image of the effective slit, $x_2$ is the distance from the optical axis to another one end (which is the end remote from the optical axis) or the image of the effective slit, s is the effective width, and a is the distance from the optical axis to the linear scanning position.

While in the above-described embodiment, the width of slits 93a and 93b was one element which determines the effective slit width s, it will be noted that a reflectable portion and a non-reflectable portion can be formed on the reflecting surfaces 94a and 94b of the reflecting means 94 to adjust the effective reflecting surface, thereby determining the optimal conditions.

According to the present invention, it is possible to provide an image forming optical apparatus which can minimize the unevenness in irradiance and can supply a sufficient irradiance by the construction as described above.

What is claimed is:

1. An optical imaging system for projecting light images from an object surface toward an image surface, said imaging system including a plurality of optical devices comprising a roof mirror lens array, said roof mirror lens array comprising a lens array and a roof mirror array which are fabricated by precise plastic molding and are integrally elongated, said roof mirror lens array being disposed between the object surface and the image surface, wherein an irradiance distribution at the imaging surface of said roof mirror lens array is given by:

$$L_T(y) = C \sum_{i=1}^{N} \left[ \int_{x_1}^{x_2} V_i([y-(i-1)p]^2 + x^2]^{\frac{1}{2}}) x \frac{z^4}{[\{y-(i-1)p\}^2 + x^2 + z^2]^2} dx \right]$$

where $L_T(y)$: irradiance distribution at the imaging surface of the roof mirror lens array $V_i(\ )$: aperture efficiency at the position on the imaging surface p: array pitch of the i'th single lens system x: position perpendicular to the array in the image surface y: position parallel to the array in the image surface;

i: the i'th lens of the roof mirror lens array;

and the irradiance unevenness for scanning $\Delta L_T$ is determined by:

$$\Delta L_T = \frac{L_T \max - L_T \min}{L_T \max}$$

where $L_T$ max and $L_T$ min, respectively, indicate the maximum and minimum of the irradiance distribution $L_T(y)$, a slit being provided having the slit position ($x_1$, $x_2$) and slit width $\overline{x_1, x_2}$ so that said $L_T(y)$ is made to be maximum and said $\Delta L_T$ is made to be minimum.

2. An optical imaging system as claimed in claim 1, wherein said slit comprises an aperture of a housing in which said roof mirror lens array is fixedly received.

3. An optical imaging system as claimed in claim 1, wherein said slit is set by effective reflecting surfaces of a first reflecting means for deflecting an image of the object in a direction of said imaging system and a second reflecting means for further deflecting the reflected light from said imaging system in a direction away from said object.

* * * * *